United States Patent [19]

Filidoro et al.

[11] 4,351,353

[45] Sep. 28, 1982

[54] BALANCED-SPOTTER VALVE

[75] Inventors: Roberto Filidoro, Palese; Nicola Di Sciascio, Bari, both of Italy

[73] Assignee: Nuovo Pignone S.p.A., Florence, Italy

[21] Appl. No.: 172,017

[22] Filed: Jul. 24, 1980

[30] Foreign Application Priority Data

Sep. 17, 1979 [IT] Italy ................................ 25762 A/79

[51] Int. Cl.³ .............................................. F16K 1/12
[52] U.S. Cl. ...................................... 137/219; 251/14; 251/61; 251/85; 251/282
[58] Field of Search ................ 137/219; 251/61, 63.4, 251/85, 282, 14

[56] References Cited

U.S. PATENT DOCUMENTS

| 933,468 | 9/1909 | Koenig | 251/282 X |
| 3,102,550 | 9/1963 | Shand et al. | 251/282 X |
| 3,765,438 | 10/1973 | Di Sciascio | 137/219 |
| 4,071,221 | 1/1978 | Di Sciascio | 251/85 X |
| 4,141,534 | 2/1979 | Goga et al. | 137/219 X |

FOREIGN PATENT DOCUMENTS 43089  4/1960  Poland .............................. 137/219

Primary Examiner—Gerald A. Michalsky
Attorney, Agent, or Firm—Morgan, Finnegan, Pine, Foley & Lee

[57] ABSTRACT

A control valve with balanced plug for fluid flow control having a cylindrical guide barrel provided with discharge ports, and a coaxial plug which slides in the plug. The plug is balanced through bores which cause the pressure to be the same on opposing faces of the plug and upstream and downstream of the plug. The plug is rigidly connected by a control lever to an operating stem of the valve, in such a manner that the plug and the stem move rigidly in the same direction along non-coinciding parallel axes.

The lever is resilient to compensate for errors of parallelism between the operating stem and the barrel caused by constructional defects or severe operating conditions.

Preferably the lever is of the gooseneck type to limit weight and overall size, and the neck of the valve body is of elliptical cross-section.

The valve is of the universal type, and operates independently of the direction in which the fluid flows.

9 Claims, 16 Drawing Figures

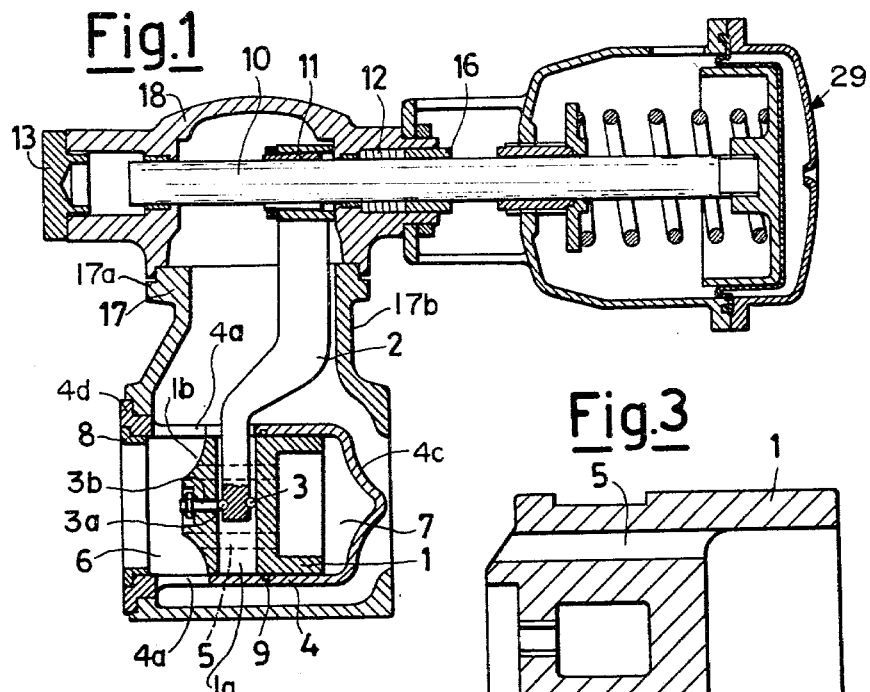
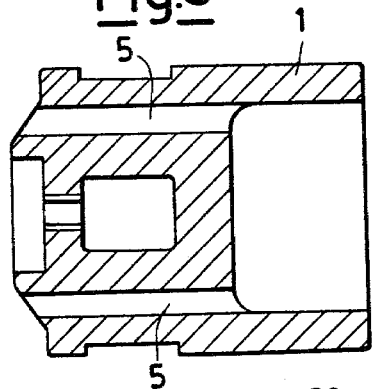
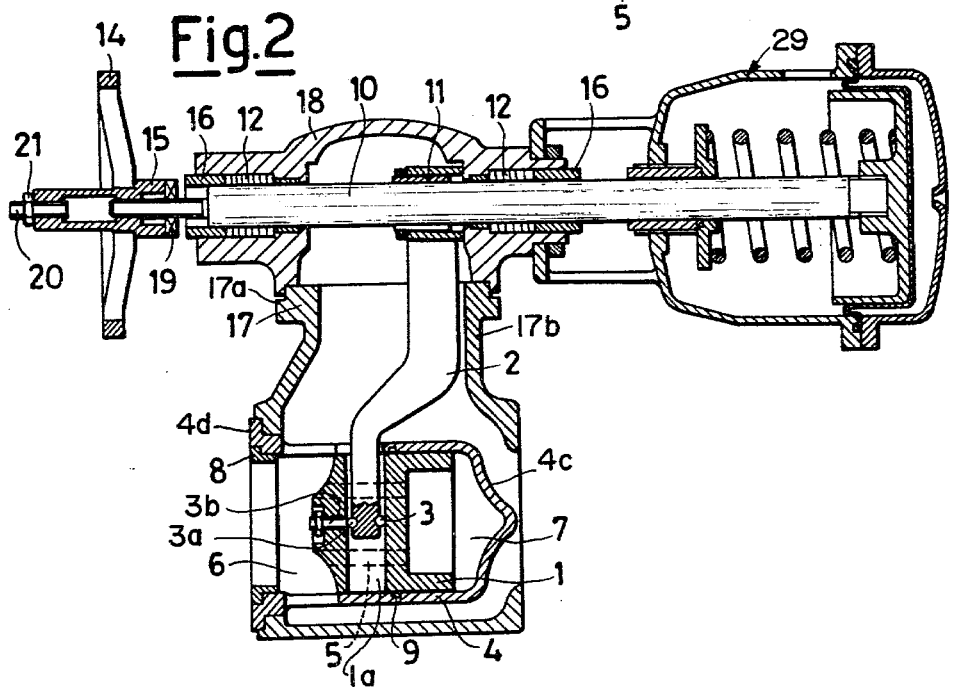

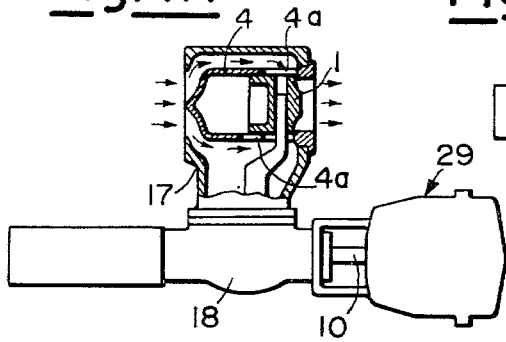
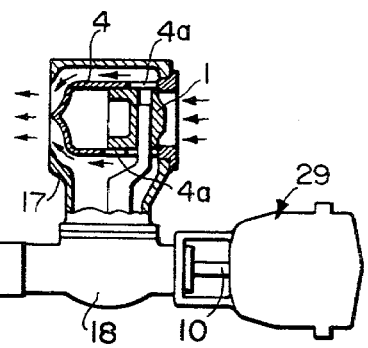
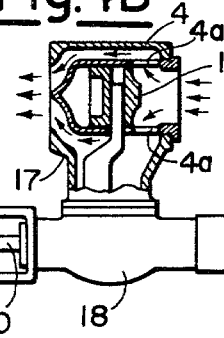
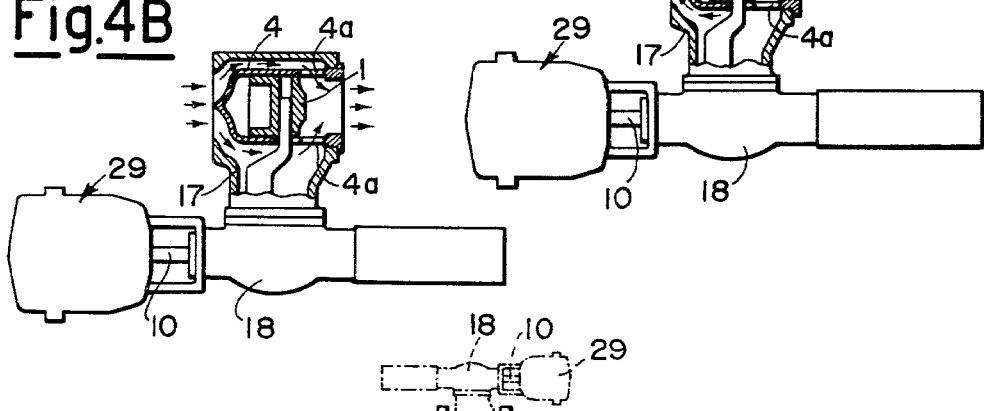
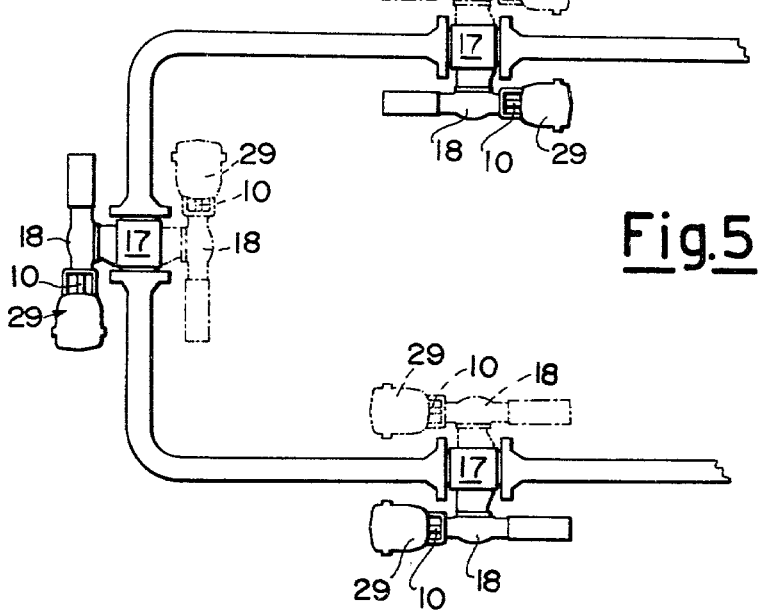

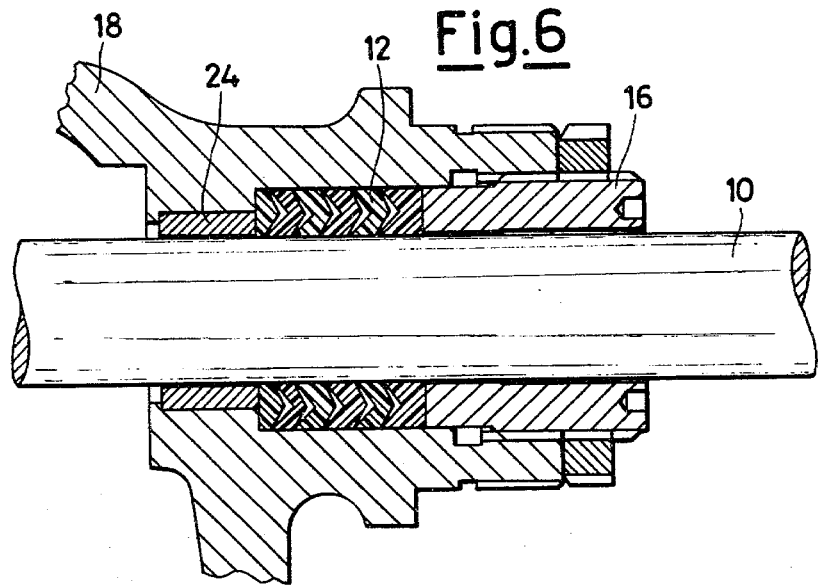
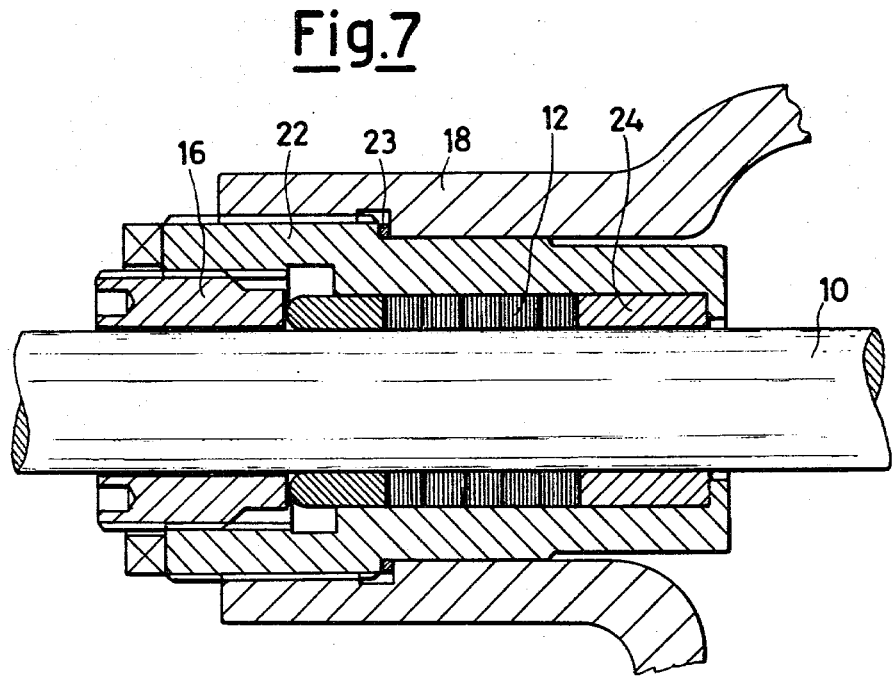

BALANCED-SPOTTER VALVE

This invention relates to valves which control the flow of fluids. In particular, this invention relates to balanced plug valves, i.e. valves in which the plug is subjected to the same pressure on its two end faces, such that the forces generated on the plug by the action of the fluid are very small. Accordingly, both the plug and its actuator operate under low stress conditions. As a consequence, the valve is extremely compact and of a simple construction.

In the present invention the valve includes a balanced plug coaxial to the flow, and the plug and a mobile actuator member move rigidly together in noncoinciding parallel directions.

Essentially, the valve according to the invention comprises a plug which slides in a cylindrical barrel which has discharge ports and which is coaxial to the pipe. The plug is connected to the stem of the actuator- or control member-by means of a lever.

The plug is balanced through bores which maintain the same pressure on both sides of the plug and within the barrel, upstream and downstream thereof. These and further characteristics of the invention will be apparent from the following detailed description and accompanying drawings of illustrative embodiments of the invention. It is to be understood that the invention is capable of modification and variation to those skilled in the art within the spirit and scope of the invention.

In the drawings:

FIG. 1 is a longitudinal view, partly in section, of one embodiment of the valve of the present invention.

FIG. 2 is a longitudinal view, partly in section, of another embodiment of the valve of the invention.

FIG. 3 is a longitudinal sectional view of the plug shown in FIGS. 1 and 2.

FIGS. 4a–4d are schematic views of the valve of the invention illustrating that the valve is independent of the direction of fluid flow.

FIG. 5 diagrammatically shows valves of the invention connected to piping.

FIG. 6 is an enlarged view, partly in section, of the valve stem and one embodiment of the packing assembly therefor FIG. 7 is an enlarged view, partly in section, of the valve stem and another packing assembly therefor.

Figure 8:
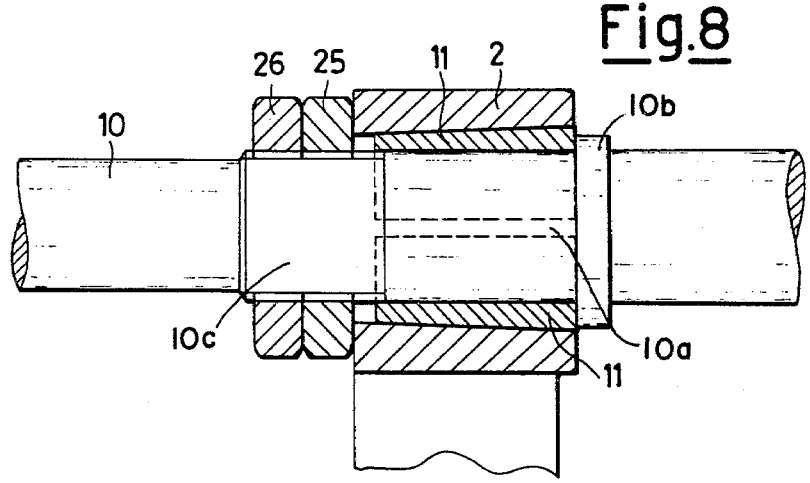

FIG. 8 is an enlarged view, partly in section, illustrating the connection between the valve stem and control lever.

Figure 9:
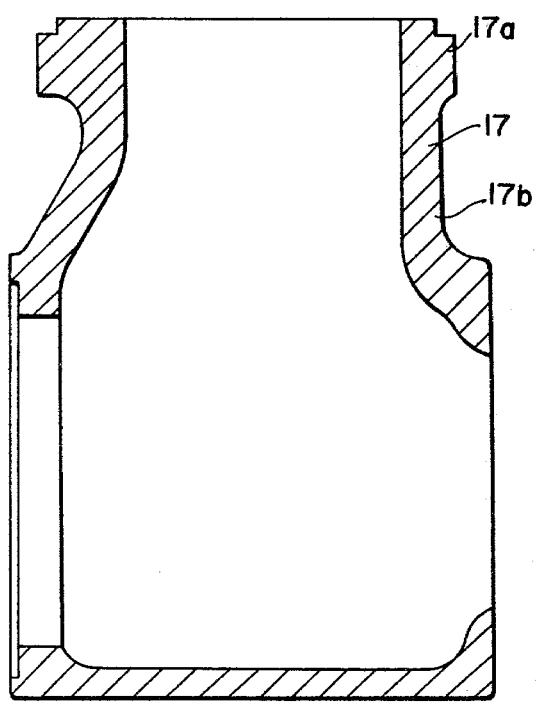

FIG. 9 is an enlarged sectional view of the valve body shown in FIGS. 1 and 2.

Figure 10:
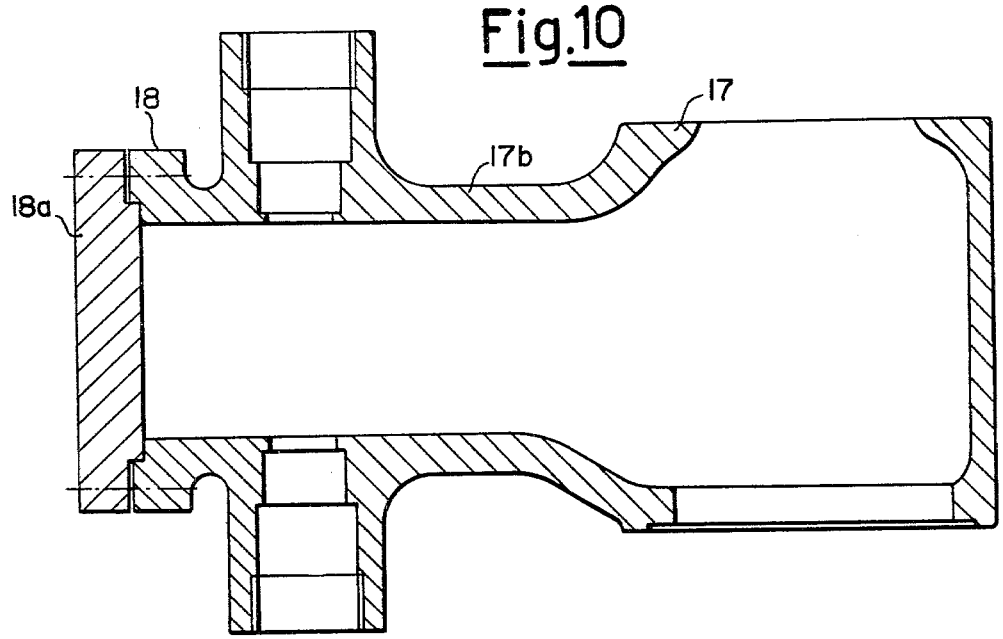

FIG. 10 is an enlarged sectional view of another embodiment of the valve body.

Figure 11:
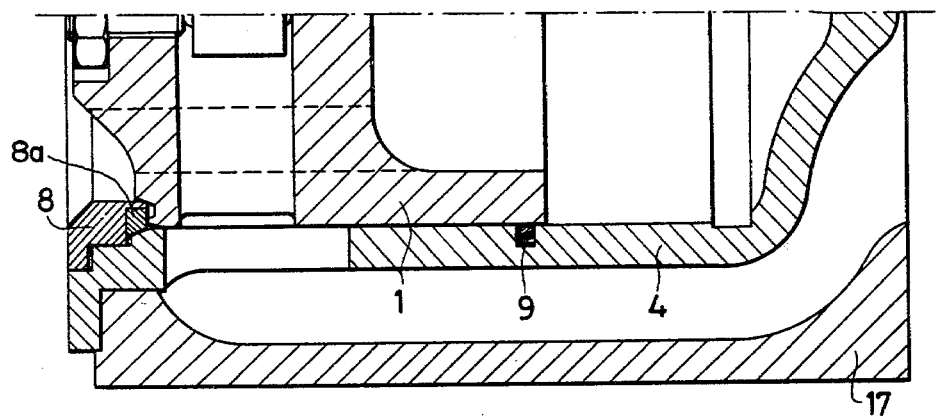

FIG. 11 is an enlarged sectional view illustrating one embodiment of a seal for the plug seated in the valve barrel.

Figure 12:
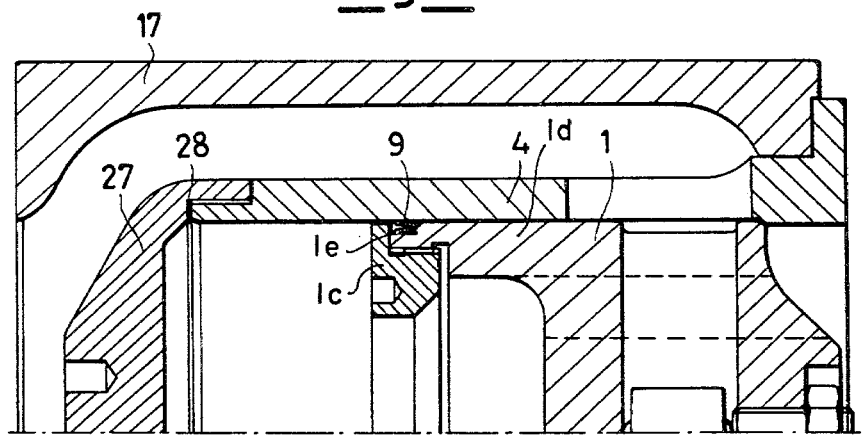

FIG. 12 is an enlarged sectional view illustrating an embodiment of the valve barrel for high temperature conditions.

Figure 13:
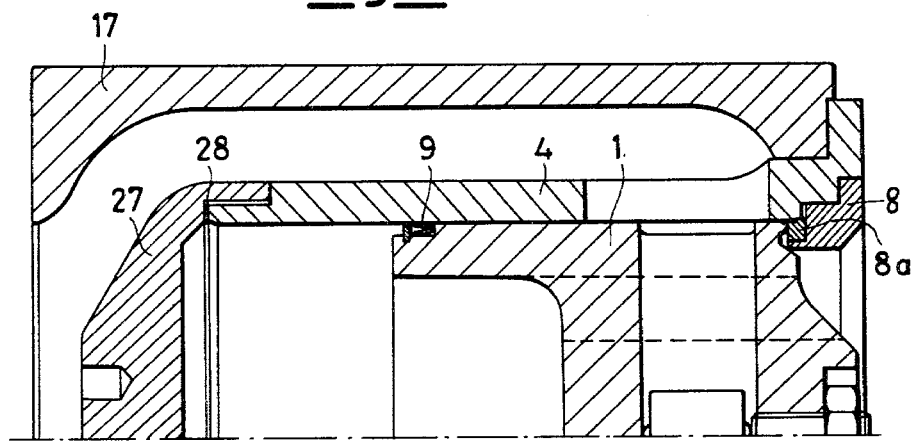

FIG. 13 is an enlarged sectional view of another embodiment of the valve barrel.

Referring to the valves of FIGS. 1 and 2, the valve plug 1 is of substantially cylindrical shape and is controlled by the lever 2 connected thereto by means 3. The plug 1 slides in the barrel 4. The barrel 4, of substantially cylindrical shape, is provided with ports 4a disposed symmetrically along its cylindrical surface to provide communication between the valve inlet and outlet. As the plug 1 moves, it covers and uncovers said ports to thus control the flow.

As shown in FIG. 3, the plug 1 is provided with a cavity 1a orthogonal to its axis to house the connector 3, and at least one through bore 5 to connect sections 6 and 7 in the barrel to attain the same pressure on opposing sides of the plug.

The barrel 4 is provided with a single seat 8, which enables leakages to be prevented or minimised when the valve is closed, and with a seal ring 9 which prevents leakages between the upstream and downstream sections through the balancing bores 5.

The outer end of the barrel is provided with a conical deflector 4c, whereas its other end terminates in a collar 4d for support on the valve body 17.

That face 1b of the plug 1 which faces the seat 8 is of conical profile, and the edges of the barrel ports 4a and 4b are rounded. This construction reduces pressure drop and the drawbacks caused by lines of flow which are not smooth.

As shown, the connection means 3 between the lever 2 and plug 1 has two balls 3a locked by a stop dowel 3b. The point contact between the lever 2 and plug 1 ensures the desired sliding of the plug 1 in the barrel 4, and also provides better seating of the plug 1 on the seat 8 when the valve is closed. For the purpose of simplifying construction, the control lever 2 is preferably of gooseneck shape.

The control lever 2 is rigid with the operating stem 10 by way of a conical split ring 11, which is locked by means of a ring nut screwed on to the conical ring.

The connection between the operating stem 10 and plug 1 is extremely advantageous both in eliminating the effects of possible errors of parallelism between the operating stem axis and the plug axis, and in compensating errors of parallelism in the walls of the radial cavity 1a in the plug 1.

As the lever 2 is resilient, this type of connection also dampens and absorbs any stresses due to transient situations in the flow rate of the fluids passing through the valve. A characteristic of the valve according to the invention is the fact that it is constructed without flanges for connection to the pipe.

In this respect, according to a preferred embodiment, it can be clamped between the backing flanges of the pipe concerned by means of resilient tie rods and suitable gaskets. This type of assembly reduces the stresses to which the valve body 17 is subjected under the action of the pressure.

Furthermore, this type of construction considerably facilitates the castings necessary for manufacturing the valve body 17, and reduces the weight and overall size of the valve.

Because of the symmetry of the cap 18, the actuator 29 can be mounted parallel to the pipe axis on both sides of the cap 18, enabling the action of the actuator 29 to be reversed from "air closes" to "air opens".

As the operation of the valve is independent of the direction in which the fluid flows through the valve body 17, four operating conditions are possible as shown in FIG. 4, i.e.:

A: air opens—flow closes
B: air closes —flow closes
C: air opens—flow opens
D: air closes—flow opens.

Because of the intrinsic characteristics of the valve, and in particular the fact that its overall size and weight are less than for corresponding conventional valves, the valve can be mounted in the pipe in any position, as indicated diagrammatically in FIG. 5.

The valve can be constructed in two versions.

In the first, shown in FIG. 1, the outside seal between the stem 10 and cap 18 is formed by a set of packing rings 12, while on the other side of the cap 18 is closed by a threaded plug 13.

In the second version shown diagrammatically in FIG. 2, the outside seal is formed on both sides of the cap 18 by two sets of packing rings 12.

In this case, the operating stem 10 is perfectly balanced in relation to the thrust of the process fluid.

This enables the working stresses in the actuator 29 to be minimised, so reducing its dimensions.

In this latter version, the stem 10 can be threaded at the opposite end to the actuator 29 in order to enable a manual operating device to be mounted. As shown, this device includes the hub 15, engaged by the operating handwheel 14, the thrust bearing 19 which minimises friction, and the mechanical limiting screw 20 with its locking nut 21.

In both of the illustrated versions, the gland nut 16 is in the form of a bored ring nut which exerts pressure by way of adaptor rings as shown in FIG. 6.

Alternatively, the outside seal can be an extractable gland pack, as shown in FIG. 7. The gland chamber is provided in a cylindrical bushing 22 screwed into the cap 18, to house the set of packing rings 12 clamped between the slide sleeve 24 for the stem 10 and the gland nut 16.

The seal between the cap 18 and bushing 22 and is provided by the gasket 23.

An embodiment of the connection between the control lever 2 and the operating stem 10 is shown in FIG. 8.

This connection is formed by a conical ring in two halves 11 mounted on a projection 10a on the stem 10 and fixed against collar 10b with a nut 25 and locking nut 26 are screwed on to a threaded portion 10c of the stem 10.

Two versions of the valve body 17 are shown in FIGS. 9 and 10.

In FIG. 9, the valve body 17 is very similar to a cylinder carrying a flanged connection 17a on the side which is connected to the cap 18.

The smooth surface for the gasket and the threaded bores for housing the fixing studs are provided on the flat section. In the version of FIG. 10, the cap 18 is in one piece with the valve body 17, and is closed by means of a blank flange.

The valve body neck 17b is preferably elliptical to enable the control lever 2 to move and the resilient connection tie rods between the pipe flanges to be assembled, within a minimum overall size.

The embodiment of the invention shown in FIG. 11, ensures a tight seal when the plug 1 is closed. As shown the seat 8 inserted into the barrel 4 is provided with a resilient insert 8a forced into a suitably shaped cavity.

The plug 1 is shaped in such a manner that it firstly abuts against the resilient insert 8a (soft seal), and then against the seat 8 (metal seal) to safeguard the insert.

For high temperature operation, the barrel 4 can be constructed as shown in FIG. 12.

The seal for balancing the plug 1 is provided by a split ring 9 suitable for continuous high temperature operation.

The seat 8 is formed in one piece with the barrel 4, which is open at the end opposite the collar 4d which connects it to the body 17, and is closed by a threaded cover 27 provided with an external deflector.

The seal between the cover 27 and barrel 4 is provided by the gasket 28.

The plug 1 is in two pieces 1c and 1d to create the cavity 1e for housing the seal ring 9.

For high temperature operation or operation under tight seal conditions, the barrel 4 is constructed as shown in FIG. 13. The inserted seat 8 and that face of the plug 1 which faces the seat 8 are of the same construction as shown in FIG. 11. In contrast, the barrel 4 is in two pieces, and is closed by a threaded profiled cap 27.

The seal between the cap 27 and barrel 4 is provided by the gasket 28.

The novel aspects of the valve according to the invention are apparent from the description.

It can be seen that the flow through the valve undergoes a smaller pressure drop than in the case of known valves, and thus provides a high throughput coefficient.

A further advantage is the fact that the servomotor controlling the valve plug 1 can be of reduced power and of reduced overall size.

There are therefore no particular constraints in choosing the type of valve operation, which can be electrical, pneumatic or of other type.

The fact that during its travel the plug 1 encounters resistance only in terms of friction between the plug 1 and barrel 4, and that in all positions it is guided by the barrel 4, means that it can be constructed from semi-finished products of small thickness and weight.

In comparison with known valves of conventional type, the valve according to the present invention can be constructed with a weight saving which can exceed 50% for the same performance.

Cost economy can also be greater.

As a result of the various assemblies, air action and flow direction possibilities, the valve of the present invention is of a universal type.

We claim:

1. A control valve having ports through which fluid flows, comprising plug means and an operating stem within the valve, wherein said stem is displaced from said plug and is adapted to move said plug means parallel thereto, and wherein said plug means is movable coaxially to the direction of fluid flow for uncovering and covering the ports in the valve to control the flow of fluid therethrough, and wherein said plug means includes bore means therethrough for balancing fluid pressure on its opposing ends and an intermediate radial cavity therein, a lever between said stem and plug means fixedly connected to said steam and extending into said radial cavity of said plug means for transferring the movement of said stem to said plug means, wherein said lever is flexible for adjusting and maintaining the parallel movement between said stem and plug means, and point contact means in said radial cavity for connecting said lever to said plug means, wherein said point contact means further ensures the proper movement of said plug means.

2. The control valve of claim 1, wherein said balanced plug means relieves pressure upon said operating stem caused by the fluid flowing through the valve.

3. The control valve of claim 1, wherein said flexible lever is fixed on said actuating stem by a divided conical clamping ring.

4. The control valve of claim 1, wherein said flexible lever is in the shape of a gooseneck.

5. The control valve of claim 1, wherein said point contact means includes spherical balls within said radial cavity on opposite sides of said lever, and locking means extending into said cavity which maintain said balls in contact with said lever.

6. The control valve according to claim 1, wherein said operating stem extends through an opening in the valve, and wherein a removable seal is provided about said actuating stem and in the opening to prevent the flow of fluid therethrough, including a bushing in said opening and about said stem, a sleeve within and at one end of said bushing, packing rings between said bushing and said stem, and clamping means opposite said sleeve for securing said rings therebetween.

7. The control valve according to claim 1, wherein said valve includes a single piece valve body in which said plug means moves and for an open ended cap in which said stem moves, and flanged means for closing said open end of said cap.

8. The control valve according to claim 1, wherein the valve includes a seat for said plug means, and wherein said seat has a resilient insert thereabout for a tight seal with said plug means as it covers said ports.

9. The control valve according to claim 1, wherein the valve includes a cylindrical barrel therewithin with said ports disposed symmetrically along its cylindrical surface to provide communication between a valve inlet and outlet, and wherein said plug means slides in said barrel to cover and uncover said ports to thereby control the flow of fluid.

* * * * *